(12) United States Patent
Yukawa

(10) Patent No.: US 11,241,900 B2
(45) Date of Patent: Feb. 8, 2022

(54) SHEET, LAMINATE SHEET, AND PRINTING DEVICE

(71) Applicant: FUJIFILM Business Innovation Corp., Tokyo (JP)

(72) Inventor: Toshiyasu Yukawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 358 days.

(21) Appl. No.: 16/542,283

(22) Filed: Aug. 15, 2019

(65) Prior Publication Data

US 2020/0290388 A1 Sep. 17, 2020

(30) Foreign Application Priority Data

Mar. 15, 2019 (JP) .............................. JP2019-048712

(51) Int. Cl.
| | | |
|---|---|---|
| *B41M 5/50* | (2006.01) | |
| *B41F 23/08* | (2006.01) | |
| *B32B 7/14* | (2006.01) | |
| *B32B 3/26* | (2006.01) | |
| *B32B 3/04* | (2006.01) | |

(Continued)

(52) U.S. Cl.
CPC ............... *B41M 5/502* (2013.01); *B32B 3/04* (2013.01); *B32B 3/06* (2013.01); *B32B 3/266* (2013.01); *B32B 5/142* (2013.01); *B32B 7/14* (2013.01); *B41F 23/08* (2013.01); *G09F 3/0288* (2013.01); *G09F 3/02883* (2021.05); *G09F 3/10* (2013.01); *B32B 2307/402* (2013.01); *B32B 2307/412* (2013.01); *B32B 2307/75* (2013.01); *B32B 2367/00* (2013.01); *B32B 2405/00* (2013.01); *G09F 2003/0201* (2013.01); *G09F 2003/0248* (2013.01); *G09F 2003/0251* (2013.01); *G09F 2003/0266* (2013.01); *G09F 2003/0269* (2013.01); *G09F 2003/0273* (2013.01)

(58) Field of Classification Search
CPC ........ B32B 3/04; B32B 7/14; B32B 2519/00; G09F 3/02883; G09F 2003/0248; G09F 2003/0273; G09F 2003/0201; G09F 2003/0251
See application file for complete search history.

(56) References Cited

U.S. PATENT DOCUMENTS

| | | | |
|---|---|---|---|
| 6,941,689 B1* | 9/2005 | Seidl ..................... | G09F 3/0289 40/310 |
| 2002/0179617 A1* | 12/2002 | Barthlow ........... | A47G 23/0216 220/739 |

(Continued)

FOREIGN PATENT DOCUMENTS

| | | |
|---|---|---|
| JP | H05-188863 | 7/1993 |
| JP | H05-204312 | 8/1993 |

*Primary Examiner* — Jasper Saberi
(74) *Attorney, Agent, or Firm* — JCIPRNET

(57) ABSTRACT

A sheet includes a first surface, a second surface, an adhesive portion, a fold-back portion, and a first area. The first surface extends in a first direction. The second surface is opposite to the first surface, and allows light to pass therethrough from the first surface to the second surface. The adhesive portion is a portion of the first surface to which an adhesive is applied, and is disposed at a first end portion of the sheet in the first direction. The fold-back portion is disposed on the first end portion. The first area is disposed on the adhesive portion between a first edge of the first end portion and the fold-back portion.

19 Claims, 11 Drawing Sheets

(51) Int. Cl.
  *G09F 3/10*    (2006.01)
  *B32B 3/06*    (2006.01)
  *B32B 5/14*    (2006.01)
  *G09F 3/02*    (2006.01)

(56) References Cited

U.S. PATENT DOCUMENTS

| | | | |
|---|---|---|---|
| 2004/0166277 A1* | 8/2004 | Key | G09F 3/04 |
| | | | 428/41.8 |
| 2009/0206594 A1* | 8/2009 | Tokita | B65D 23/085 |
| | | | 283/81 |
| 2009/0291240 A1* | 11/2009 | Moosheimer | G06K 19/0776 |
| | | | 428/34.1 |
| 2012/0125986 A1* | 5/2012 | Walton | G09F 3/10 |
| | | | 229/87.05 |
| 2019/0366700 A1* | 12/2019 | Maloney | B32B 37/142 |

* cited by examiner

| PERFORATION LINE | 0.3:0.3 | 0.5:0.5 | 0.6:0.6 | 1.0:1.0 | 0.3:0.6 | 0.6:0.3 |
|---|---|---|---|---|---|---|
| TENSILE STRENGTH | FAIR | GOOD | GOOD | GOOD | EXCELLENT | POOR |
| FOLDABILITY | GOOD | FAIR | FAIR | GOOD | POOR | GOOD |

SHEET, LAMINATE SHEET, AND PRINTING DEVICE

CROSS-REFERENCE TO RELATED APPLICATIONS

This application is based on and claims priority under 35 USC 119 from Japanese Patent Application No. 2019-048712 filed Mar. 15, 2019.

BACKGROUND

(i) Technical Field

The present disclosure relates to a sheet, a laminate sheet, and a printing device.

(ii) Related Art

A sheet label wound around an object such as a PET bottle made of polyethylene terephthalate is known.

For example, Japanese Patent Application Publication No. 5-204312 discloses a label formed from two sheets laminated while having their print surfaces located on the inner sides.

Another known example of a label wound around an object is formed from one sheet with a surface that is brought into contact with an object, that is subjected to printing, and that receives an adhesive.

SUMMARY

Aspects of non-limiting embodiments of the present disclosure relate to a sheet including in advance an adhesive with which it is bonded to an object, and bonded to the object while having a surface on which an image is formed facing the object, a laminate sheet including the sheet laminated on another sheet, and a printing device that performs printing on the laminate sheet.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a sheet including a first surface that extends in a first direction; a second surface that is opposite to the first surface and allows light to pass therethrough from the first surface to the second surface; an adhesive portion that is a portion of the first surface to which an adhesive is applied, and that is disposed at a first end portion in the first direction; a fold-back portion disposed on the first end portion; and a first area disposed on the adhesive portion between a first edge of the first end portion and the fold-back portion.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will now be described, below.

Figure 1A:
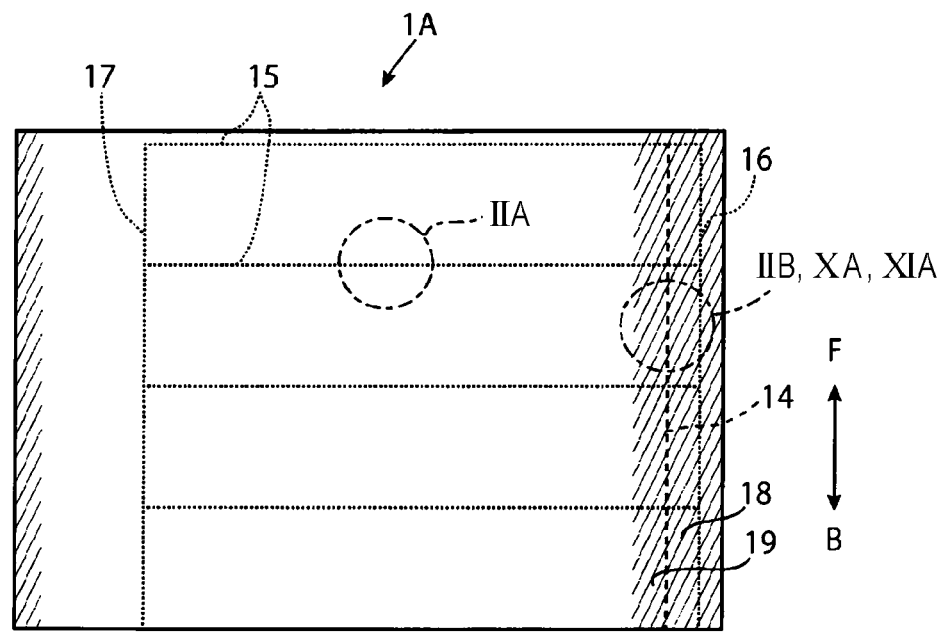
FIGS. 1A and 1B illustrate a laminate sheet according to a first exemplary embodiment of the disclosure.
Figure 1B:
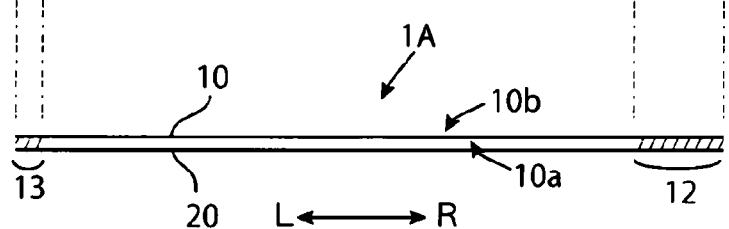

FIGS. 1A and 1B illustrate a laminate sheet according to a first exemplary embodiment of the present disclosure. Here, FIG. 1A is a plan view and FIG. 1B is a side view. In the side view of FIG. 1B, the thickness of an adhesive is exaggerated for ease of understanding.

A laminate sheet 1A includes a first sheet 10 and a second sheet 20 laminated on a first surface 10a of the first sheet 10. The first sheet 10 is an optically transparent thin plastic sheet. The second sheet 20 is a sheet thicker than the first sheet 10 to serve as a mount for the first sheet 10.

At an end portion in the direction of arrow R on the first surface 10a of the first sheet 10 facing the second sheet 20, a bonded area 12 to which an adhesive is applied is formed. Also at an end portion in the direction of arrow L on the first surface 10a of the first sheet 10 facing the second sheet 20, a bonded area 13 to which an adhesive is applied is formed. In the exemplary embodiment, the bonded area 13 at the end portion in the direction of arrow L is used to only keep the first sheet 10 bonded to the second sheet 20 so as not to allow the first sheet 10 and the second sheet 20 to be detached from each other without being effectively used later. The adhesive in the bonded areas 12 and 13 is more easily removable from the second sheet 20 than from the first sheet 10, and kept bonded to the first sheet 10 when the first sheet 10 is removed from the second sheet 20.

At the end portion of the first sheet 10 in the direction of arrow R at which the bonded area 12 is formed, a fold-back line 14 extending in the direction of arrow F-B, crossing the direction of arrow L-R, is formed. The fold-back line 14 according to the present exemplary embodiment is formed from a perforation line that is formed from discontinuous cuts in the first sheet 10. The perforation line corresponds to an example of a first perforation line in the present disclosure. The fold-back line 14 will be described in detail, below.

The first sheet 10 includes multiple separation perforation lines 15 extending parallel to each other in the direction of arrow L-R, a perforation line 16 formed at the end portion in the direction of arrow R and extending in the direction of arrow F-B, and a perforation line 17 formed at a portion away from the end portion in the direction of arrow R and adjacent to the end portion in the direction of arrow L, and extending in the direction of arrow F-B. These perforation lines 15, 16, and 17 are also perforation lines that are discontinuous cuts in the first sheet 10. The perforation lines 15, 16, and 17 respectively correspond to examples of a third perforation line, a fourth perforation line, and a fifth perforation line of the present disclosure. These perforation lines 15, 16, and 17 also correspond to an example of a second perforation line of the present disclosure.

Here, the area interposed between the fold-back line 14 and the perforation line 16 is referred to as a first area 18. The area interposed between the fold-back line 14 and the edge of the bonded area 12 on the side of arrow L is referred to as a second area 19.

After a printing operation described later, the first sheet 10 is separated at the perforation lines 15, 16, and 17, and divided into four sheets in the example illustrated in FIG. 1A except for a portion wasted while being bonded to the second sheet 20. Each sheet obtained after separation corresponds to an example of a sheet according to an example of the present disclosure.

Figure 2A:
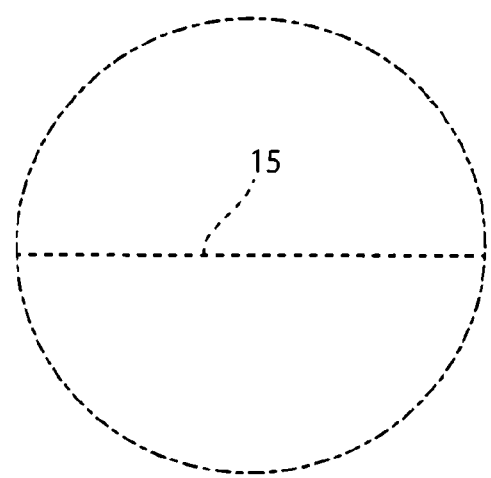
FIGS. 2A and 2B are enlarged views of a circle IIA and circle IIB, XA, XIA illustrated in FIG. 1A.
Figure 2B:
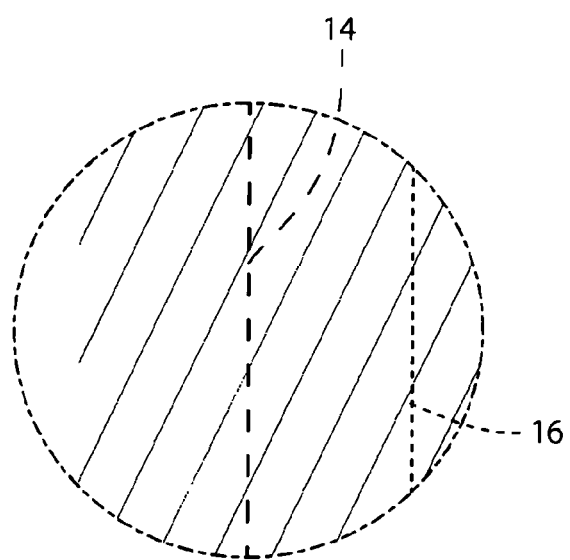

FIGS. 2A and 2B are enlarged views of circle IIA and circle IIB, XA, XIA illustrated in FIG. 1A. FIG. 2A illustrates the perforation line 15 for separation. FIG. 2B illustrates the fold-back line 14, formed from a perforation line, and the separation perforation line 16.

The separation perforation lines 15 and 16 are so-called micro-perforation lines, which are discontinuous cuts formed at a pitch finer than the pitch at which the perforation line forming the fold-back line 14 is formed. Although not illustrated in FIGS. 2A and 2B, the separation perforation line 17 illustrated in FIG. 1A is also a micro-perforation line. The separation perforation lines 15, 16, and 17 are used to tear the first sheet 10, and for facilitating tearing of the first sheet 10 and forming smooth edges with the tearing.

The perforation line serving as the fold-back line 14 is formed with discontinuous cuts formed at a wider pitch than the pitch at which the separation perforation lines 15, 16, and 17 are formed. As will be described later, sheets separated at the perforation lines 15, 16, and 17 are folded back at the fold-back line 14. Thus, the fold-back line 14 has to satisfy both easily foldable and hardly tearable characteristics. Thus, the perforation line formed at a wider pitch than the pitch at which the separation perforation lines 15, 16, and 17 are formed is used as the fold-back line 14.

Figures 3, 4:
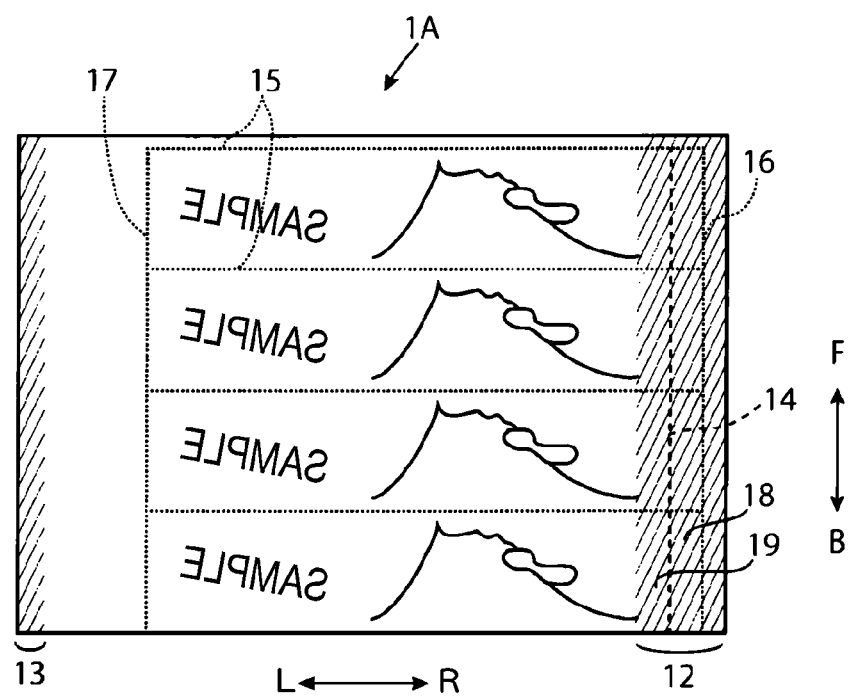
FIG. 3 is a graph of test results of perforation lines serving as fold-back lines.
FIG. 4 is a plan view of a laminate sheet subjected to printing.

FIG. 3 illustrates test results of perforation lines serving as fold-back lines.

In the test results of perforation lines, x:y such as 0.3:0.3 refers to a ratio of x to y, where x denotes the length of each cut in millimeters, and y denotes the distance between two adjacent cuts in millimeters.

The test results illustrated in FIG. 3 reveal that the tensile strength and the foldability are well balanced when x:y is 1 mm to 1 mm.

The test results illustrated here are a mere example, and changed depending on the material or the thickness of the first sheet 10. Thus, the ratio is appropriately determined depending on the used first sheet 10.

FIG. 4 is a plan view of a printed laminate sheet.

An image is printed on the laminate sheet 1A illustrated in FIGS. 1A and 1B, on a second surface 10b (refer to FIG. 1B) of the first sheet 10, opposite to the first surface facing the second sheet 20. The image printed here is a reverse image, as is clear from the characters illustrated in FIG. 4.

Figure 5:
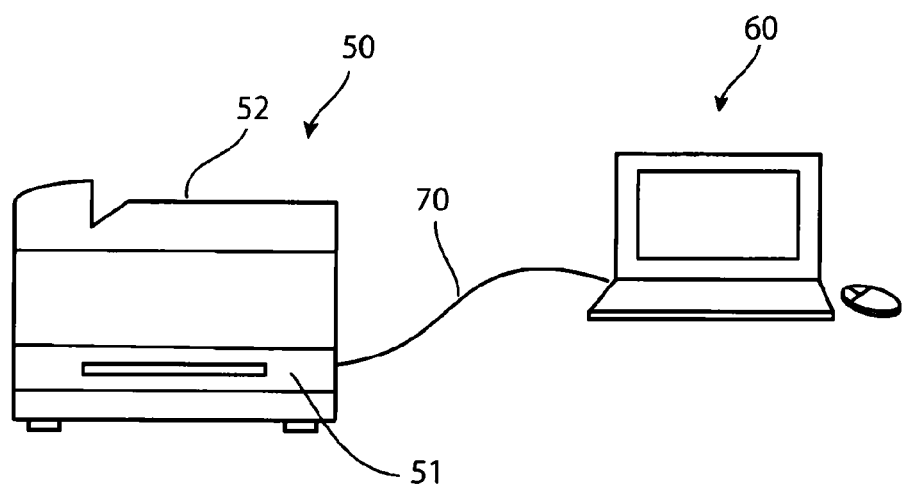
FIG. 5 is a schematic diagram of a print system.

FIG. 5 is a schematic diagram of a print system.

FIG. 5 illustrates a printer 50 and a personal computer (abbreviated to "PC", below) 60 connected with each other with a communication line 70. The printer 50 corresponds to an example of a printing device according to an embodiment of the present disclosure.

The PC 60 produces image data representing, for example, an image illustrated in FIG. 4, and transmits the image to the printer 50. The printer 50 prints the image based on the image data transmitted from the PC 60 onto a sheet. The printer 50 includes a sheet tray 51, which accommodates sheets before subjected to printing, and a discharge tray 52, to which sheets subjected to printing are discharged. When receiving image data from the PC 60, the printer 50 picks up a sheet from the sheet tray 51, prints an image on the sheet, and discharges the sheet onto the discharge tray 52. Here, printing of an image on the laminate sheet 1A illustrated in FIGS. 1A and 1B is studied.

Figure 6:
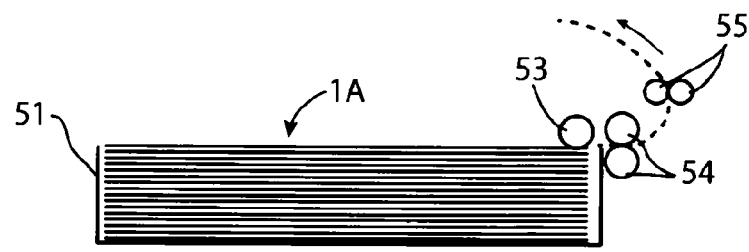
FIG. 6 is a schematic diagram of a structure of a portion of a printer from which sheets are picked up.

FIG. 6 is a schematic diagram of a structure of a printer at a portion from which sheets are picked up.

The sheet tray 51 accommodates the laminate sheets 1A. The laminate sheets 1A accommodated in the sheet tray 51 are picked up by a pickup roller 53 from the sheet tray 51, and reliably separated one from another by separation rollers 54, so that one of the laminate sheets 1A is transported by transport rollers 55. Then, a reverse image illustrated in FIG. 4 is printed on the laminate sheet 1A thus transported, which is discharged onto the discharge tray 52 illustrated in FIG. 5. Thus, when picked up from the sheet tray 51, the leading end portion of the laminate sheet 1A from which the laminate sheet 1A is picked up from the sheet tray 51 receives a high stress from the pickup roller 53 and the separation rollers 54.

Here, the laminate sheet 1A includes the separation perforation lines 15, 16, and 17, as illustrated in FIG. 1A or FIG. 4. If the laminate sheets 1A are accommodated in the sheet tray 51 in a wrong orientation, the laminate sheets 1A may be broken at the separation perforation lines. Here, the laminate sheets 1A are accommodated in the sheet tray 51 while having the end portion in the direction of arrow R located at the leading end from which the laminate sheets 1A are picked up from the sheet tray 51. The laminate sheets 1A also have the separation perforation line 16 at the end portion in the direction of arrow R. The portion including the perforation line 16, however, is bonded to the second sheet 20, and is not broken even when receiving a high stress from the pickup roller 53 or the separation rollers 54.

FIG. 7 illustrates one sheet obtained after a printed laminate sheet is separated at the perforation lines, and the method for using the sheet.

Figure 7A:
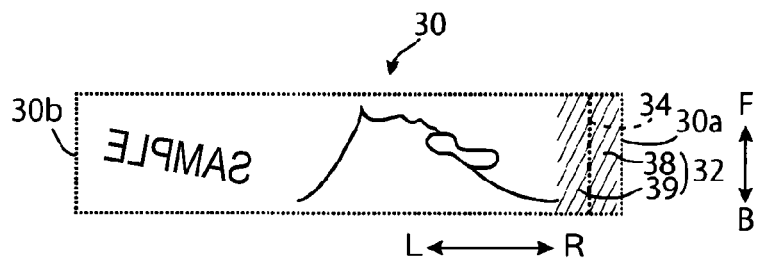
FIGS. 7A to 7D illustrate one sheet obtained after separating a printed laminate sheet at perforation lines, and a method of using the sheet.

When the first sheet 10 (refer to FIG. 1B) of the printed laminate sheet 1A illustrated in FIG. 4 is torn at the perforation lines 15, 16, and 17, a sheet 30 illustrated in FIG. 7A is formed. Here, this sheet 30 is described further.

The sheet 30 illustrated here has an image printed thereon. The sheet 30 before being subjected to printing is a sheet having a first surface (the surface facing the second sheet before detachment from the second sheet 20 illustrated in FIG. 1B) and a second surface opposite to the first surface, the surfaces allowing light to pass therethrough. The sheet 30 does not have to be colorless and transparent, and may, for example, be colored or have low light transmission. However, for clear printing, the sheet 30 before being subjected to printing is preferably as colorless and transparent as possible.

The sheet 30 extends in the direction of arrow L-R. The direction of arrow L-R is referred to as a first direction, here. An adhesive portion 32 to which an adhesive is applied is formed on the first surface (the surface facing the second sheet before being detached from the second sheet 20 illustrated in FIG. 1B) at the end portion of the sheet 30 in the direction of arrow R. The end portion in the direction of arrow R at which the adhesive portion 32 is formed is referred to as a first end portion, here. The end portion in the direction of arrow L is referred to as a second end portion, here.

A fold-back portion 34 is formed at the first end portion of the sheet 30. The fold-back portion 34 according to the exemplary embodiment extends in a second direction denoted with arrow F-B, crossing the first direction denoted with arrow L-R. Specifically, the fold-back portion 34 in the sheet 30 according to this exemplary embodiment is a perforation line, which is formed from discontinuous cuts in the sheet 30, extending in the second direction orthogonal to the first direction. The perforation line has a ratio of a distance between adjacent cuts to the length of each cut of 1 to 1.

As is clear from FIG. 1A and FIG. 4, the edge of the sheet 30 includes a portion cut at the perforation lines. The edge is formed by tearing at a so-called micro-perforation line, formed at a pitch finer than the pitch at which the perforation line for the fold-back portion 34 is formed. The edge is thus smooth without being roughed by tearing. This perforation line corresponds to an example of a second perforation line according to an exemplary embodiment of the present disclosure.

Figure 7B:
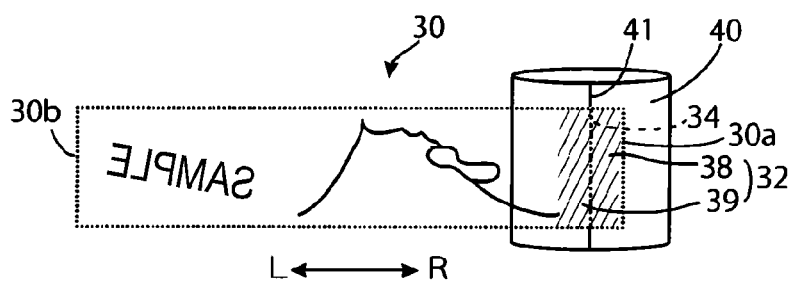

Here, the area between the fold-back portion 34 and an edge 30a closer to the first end portion is referred to as a first area 38. The edge 30a closer to the first end portion corresponds to an example of a first edge according to an exemplary embodiment of the present disclosure. The area of the adhesive portion 32 across from the first area 38 with respect to the fold-back portion 34, that is, the area between the fold-back portion 34 and the end of the adhesive portion 32 in the direction of arrow L is referred to as a second area 39. As illustrated in FIG. 7B, the first area 38 according to the present exemplary embodiment is a bonded portion bonded to a PET bottle 40. The PET bottle 40 corresponds to an example of an object to which a sheet is bonded and an object to which a sheet is wound according to an exemplary embodiment of the present disclosure.

An image is printed on the second surface of the sheet 30. The image printed on the second surface is a reverse image that is the reverse of an image actually observed.

As illustrated in FIG. 7B, the sheet 30 is bonded to the PET bottle 40. During bonding, preferably, the fold-back portion 34 is aligned with a vertically extending particle line 41 of the PET bottle 40 that is formed during manufacturing of the PET bottle 40.

Figure 7C:
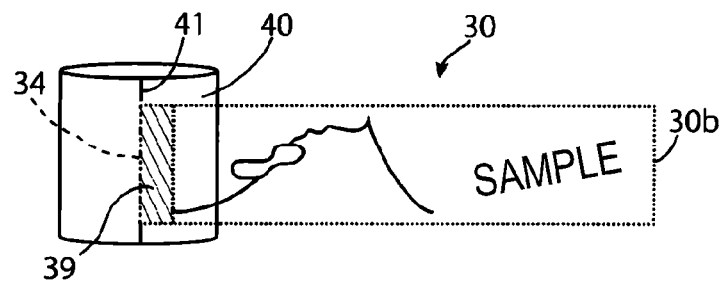
Figure 7D:
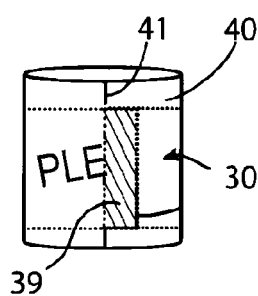

After the first area 38 of the sheet 30 is bonded to the PET bottle 40, the sheet 30 is folded back at the fold-back portion 34, as illustrated in FIG. 7C. The fold-back portion 34 includes a perforation line. Thus, the fold-back portion 34 is more easily folded back than the area adjacent to the fold-back portion 34. When the orientation of the sheet 30 is changed from the one in FIG. 7B to the one in FIG. 7C, the orientation change exerts a force of folding back on the fold-back portion 34, so that the sheet 30 is folded back at the fold-back portion 34. When the fold-back portion 34 is aligned with the particle line 41, the sheet 30 is accurately folded back sideways. When the sheet 30 is folded back at the fold-back portion 34, the second surface faces the PET bottle 40. Specifically, the image printed on the sheet 30 is visually observed correctly.

After folded back as illustrated in FIG. 7C, the sheet 30 is wound around the PET bottle 40. After being folded back at the fold-back portion 34, the first surface of the sheet 30 faces outward, and the second area 39 of the adhesive portion 32 has the adhesive disposed outward. Thus, the second end portion of the sheet 30 in the direction of arrow L illustrated in FIG. 7A, after wound around the PET bottle 40, is bonded to the second area 39. Thus, a label formed from the sheet 30 is bonded to the PET bottle 40. The print surface on the sheet 30 after bonded faces the PET bottle 40, and is thus prevented from being damaged with, for example, frictional scratches.

Figure 8A:
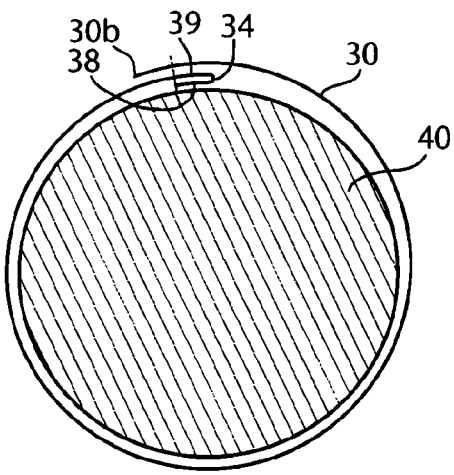
FIGS. 8A to 8C are cross-sectional views of a PET bottle around which the sheet is wound.
Figure 8B:
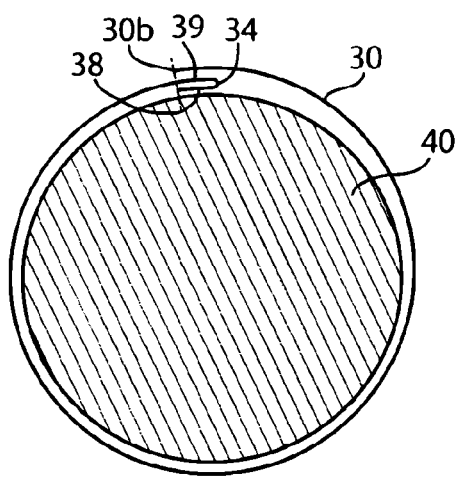
Figure 8C:
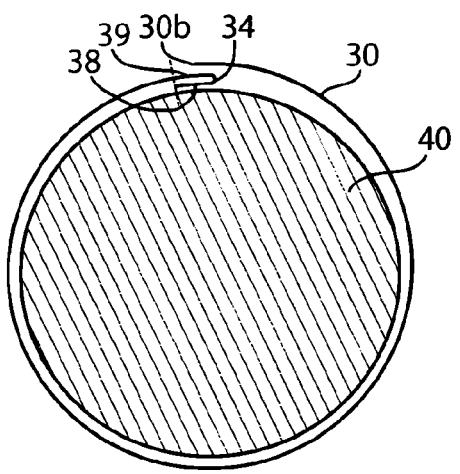

FIGS. 8A to 8C are cross-sectional views of a PET bottle around which a sheet is wound.

FIG. 8A illustrates an edge (edge closer to the second end portion in the direction of arrow L in FIG. 7A) 30b after wound around located beyond the second area 39 to which an adhesive is applied. When the wound sheet 30 is to be detached again, the sheet 30 may have such a length that the edge 30b is located beyond the second area 39, as illustrated in FIG. 8A.

In FIG. 8B, the edge 30b is aligned with the edge of the second area 39. When this structure is regarded as being preferable in design, the sheet 30 may have such a length that the edge 30b and the edge of the second area 39 is aligned with each other, as illustrated in FIG. 8B.

In FIG. 8C, the edge 30b is located to allow part of the second area 39 to be exposed to the outside. In this case, an adhesive is directly exposed to the outside, and thus may allow dust to adhere thereto or annoy a person holding the PET bottle 40. Thus, the sheet 30 having such a length as to allow part of the second area 39 to be exposed as illustrated in FIG. 8C is not recommended.

FIGS. 9A to 9E each illustrate a device that facilitates visual recognition of the position of a fold-back portion. FIGS. 9A to 9E illustrate five examples of a device that facilitates visual recognition of the position of a fold-back portion further than in the case of a structure not including the device.

Figure 9A:
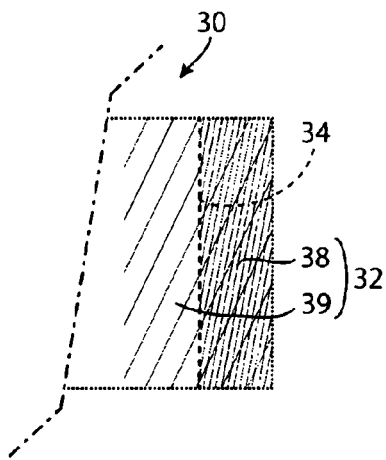
FIGS. 9A to 9E each illustrate a device that facilitates visual recognition of the position of a fold-back portion.

FIG. 9A is an example where the first area 38 is colored. The fold-back portion 34 is thus easily recognized as a colored edge.

Figure 9B:
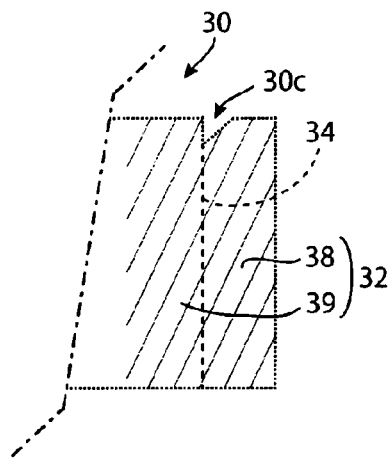

FIG. 9B is an example where the first area 38 has a notch 30c at the boundary of the fold-back portion 34. The fold-back portion 34 is thus easily recognized as an edge of the notch 30c.

Figure 9C:
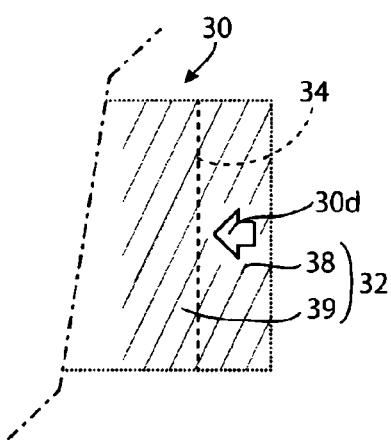

FIG. 9C is an example where the first area 38 has a mark 30d indicating the fold-back portion 34. The fold-back portion 34 is thus easily recognized by being indicated with the mark 30d.

Figure 9D:
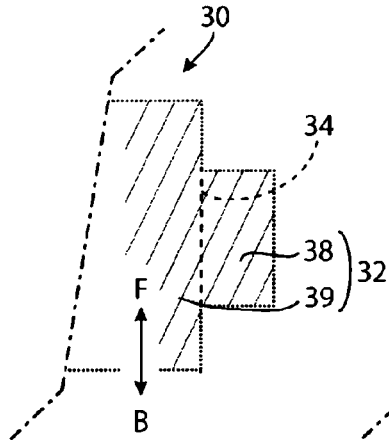
Figure 9E:
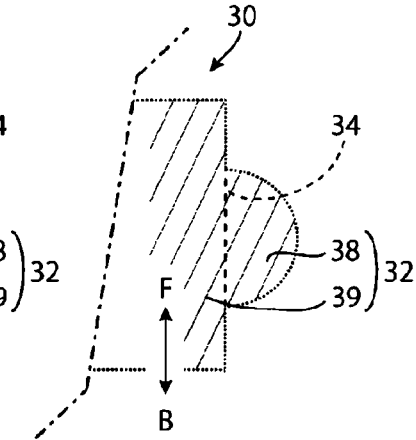

FIG. 9D and FIG. 9E are examples in each of which the first area 38 has a shape different from the second area 39 adjacent to the fold-back portion 34. Specifically, in each of both examples, the first area 38 has a dimension in the widthwise direction indicated with arrow F-B shorter than the second area 39 adjacent to the fold-back portion 34.

Here, the first area 38 illustrated in FIG. 9D is a simple rectangle having a shorter dimension in the widthwise direction. The first area 38 illustrated in FIG. 9E has a segment shape having a dimension in the widthwise direction decreasing further in the direction away from the fold-back portion 34.

Subsequently, exemplary embodiments following the second exemplary embodiment will be described. For easy understanding, the exemplary embodiments following the second exemplary embodiment will be described using the same reference signs used in the first exemplary embodiment.

Figure 10A:
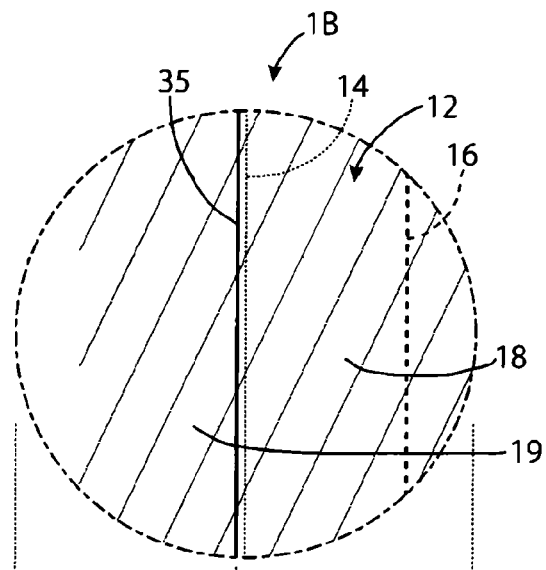
FIGS. 10A and 10B illustrate a laminate sheet according to a second exemplary embodiment of the present disclosure.
Figure 10B:
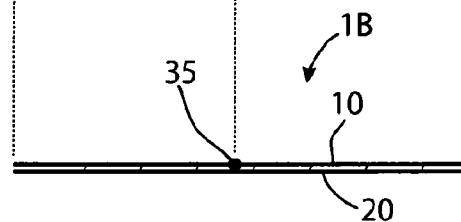

FIGS. 10A and 10B illustrate a laminate sheet according to a second exemplary embodiment of the present disclosure. FIGS. 10A and 10B are enlarged views of a laminate sheet 1B corresponding to circle IIB, XA, XIA illustrated in FIG. 1A, where FIG. 10A is a plan view and FIG. 10B is a side view.

The fold-back line 14 of the laminate sheet 1B does not include a perforation line. Instead, a rigid portion 35 formed from a hard material, such as a plastic thread, extending along the fold-back line 14 at which the sheet is to be folded back, is formed. The material is harder than the material for the adjacent areas. When each of sheets into which the laminate sheet 1B is separated is folded back, the sheet is folded back at the fold-back line 14 adjacent to the rigid portion 35.

Figure 11A:
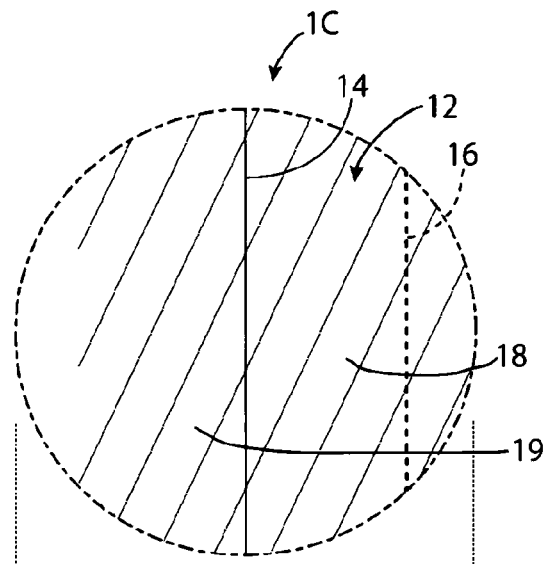
FIGS. 11A and 11B illustrate a laminate sheet according to a third exemplary embodiment of the present disclosure.
Figure 11B:
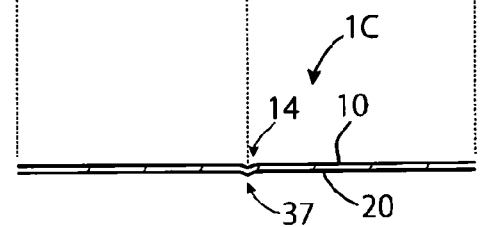

FIGS. 11A and 11B illustrate a laminate sheet according to a third exemplary embodiment of the present disclosure. As in FIGS. 10A and 10B, FIGS. 11A and 11B are enlarged views of a laminate sheet 1C corresponding to circle IIB, XA, XIA illustrated in FIG. 1A, where FIG. 11A is a plan view and FIG. 11B is a side view.

The laminate sheet 1C illustrated in FIGS. 11A and 11B has a crease 37 on the fold-back line 14. This crease 37 is formed by folding and then unfolding the laminate sheet 1C before being separated into individual sheets. The crease 37 is a fold formed so that the surface on the inner side when folded back has a recess.

When the individual sheets are folded back, each sheet is folded back at the fold-back line 14 having the crease 37.

Figure 12:
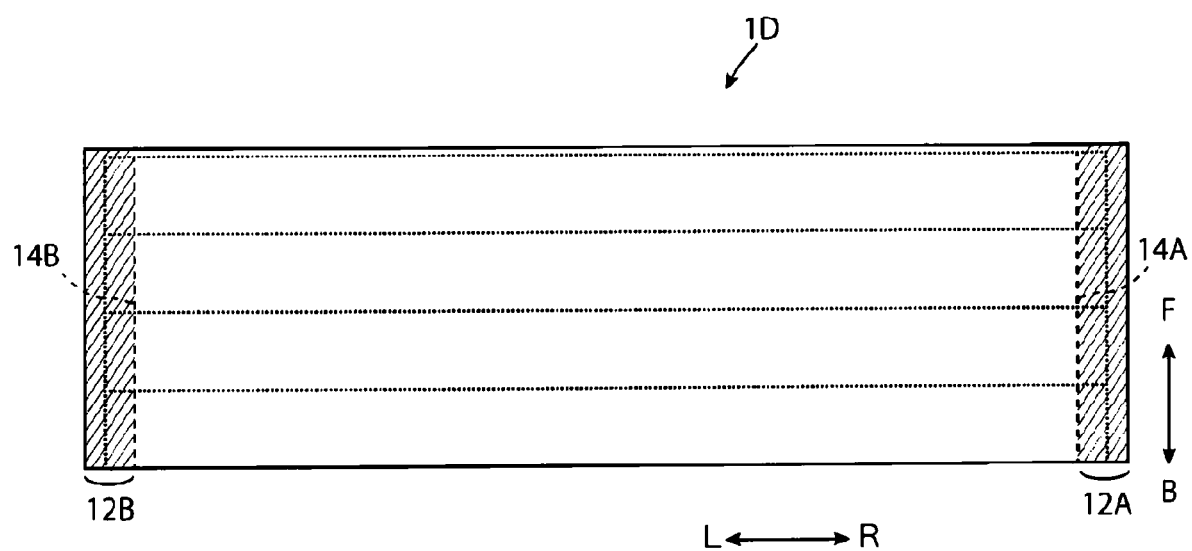
FIG. 12 is a plan view of a laminate sheet according to a fourth exemplary embodiment of the present disclosure.

FIG. 12 is a plan view of a laminate sheet according to a fourth exemplary embodiment of the present disclosure. Here, only the points different from those of the first exemplary embodiment illustrated in FIGS. 1A and 1B will be described.

A laminate sheet 1D includes bonded areas 12A and 12B at both end portions in the direction of arrow L-R. The laminate sheet 1D also has fold-back lines 14A and 14B at inner edges of the bonded areas 12A and 12B. The bonded areas 12A and 12B correspond to examples of an adhesive portion and a second adhesive portion according to an aspect of the present disclosure. The outer edges of the bonded areas 12A and 12B correspond to examples of a first edge and a second edge according to an aspect of the present disclosure. The fold-back lines 14A and 14B correspond to a fold-back portion and a second fold-back portion according to an aspect of the present disclosure. Other points of the laminate sheet 1D are the same as those of the laminate sheet 1 according to the first exemplary embodiment illustrated in FIGS. 1A and 1B, except for the dimensional differences.

Figure 13:
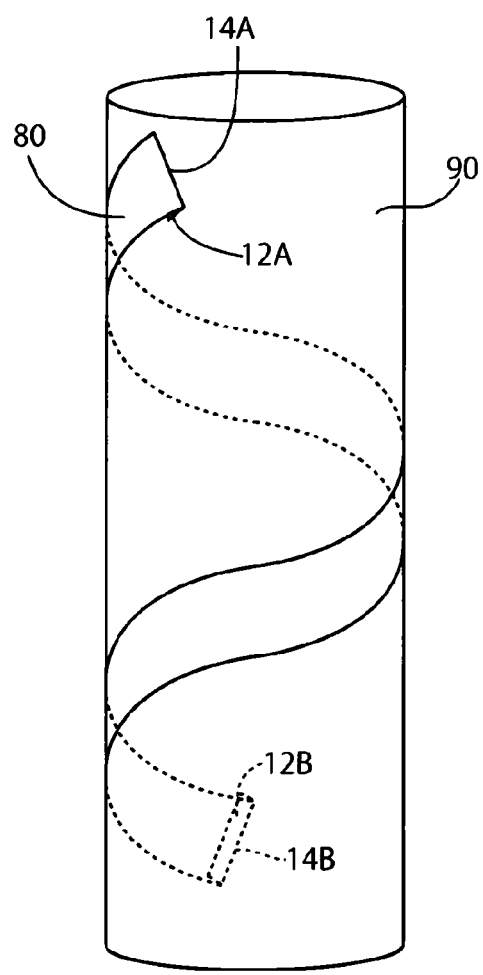
FIG. 13 is a schematic diagram of a sheet wound around a cylinder.

FIG. 13 is a schematic diagram of a sheet wound around a cylinder. Here, print on the sheet is omitted. A sheet 80 is a sheet formed by cutting the first sheet 10 (refer to FIGS. 1A and 1B) of the laminate sheet 1D illustrated in FIG. 12 at separation perforation lines. Here, for easy understanding, the reference signs of components denoted on the laminate sheet 1D before separation illustrated in FIG. 12 are used to describe the structure.

The sheet 80 is bonded to a cylinder 90 while having a first surface, to which an adhesive is applied over its bonded areas 12A and 12B, facing the cylinder 90, and folded back at the fold-back lines 14A and 14B. The portion other than the bonded areas 12A and 12B is helically wound around the cylinder 90 while having a surface that is the same as the first surface to which an adhesive has been applied in the state of the laminate sheet 1D in FIG. 12 facing outward.

Thus, the sheet and the laminate sheet according to an exemplary embodiment of the present disclosure are not limited to the ones used so as to be simply wound around an object.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A sheet comprising: a first surface that extends in a first direction; a second surface that is opposite to the first surface, and allows light to pass therethrough from the first surface to the second surface; an adhesive portion that is a portion of the first surface to which an adhesive is applied, and that is disposed at a first end portion of the sheet in the first direction; a fold-back portion disposed on the first end portion; and a first area disposed on the adhesive portion between a first edge of the first end portion and the fold-back portion; wherein the first area serves as a bonded portion, which is bonded to an object, and is folded back at the fold-back portion to allow the second surface to face the object.

2. The sheet according to claim 1, wherein the second surface has a reverse image printed thereon.

3. The sheet according to claim 1, wherein the adhesive portion includes a second area across from the first area with respect to the fold-back portion.

4. The sheet according to claim 3,
wherein the object to which the sheet is bonded is an object to which the sheet is wound, and
wherein, after the sheet is wound around the object, the second area is bonded to a second end portion of the sheet opposite to the first end portion in the first direction.

5. The sheet according to claim 1,
wherein the fold-back portion is a first perforation line formed from discontinuous cuts in the sheet.

6. The sheet according to claim 1, further comprising:
a rigid portion formed from a material harder than a material of an adjacent area, and extending along the fold-back portion.

7. The sheet according to claim 1, wherein the fold-back portion includes a crease.

8. The sheet according to claim 1, further comprising a device that facilitates visual recognition of a position of the fold-back portion.

9. The sheet according to claim 8,
wherein the first area is colored.

10. The sheet according to claim 8,
wherein the first area has a shape different from a shape of an adjacent area with the fold-back portion interposed therebetween.

11. The sheet according to claim 10,
wherein the first area has a portion having a shorter dimension in a second direction crossing the first direction than a dimension of an adjacent area with the fold-back portion interposed therebetween.

12. The sheet according to claim 11,
wherein the first area has a segment shape having a dimension in the second direction crossing the first direction gradually decreasing as the first area is spaced further from the fold-back portion.

13. The sheet according to claim 8,
wherein the first area has a notch at a border between the first area and the fold-back portion.
14. The sheet according to claim 8,
wherein the first area has a mark indicating the fold-back portion.
15. The sheet according to claim 1,
wherein the fold-back portion extends in a second direction orthogonal to the first direction.
16. The sheet according to claim 15,
wherein an object to which the sheet is wound is a PET bottle, and the sheet is wound around the PET bottle while having the fold-back portion aligned with a longitudinally extending particle line of the PET bottle.
17. The sheet according to claim 1,
wherein the fold-back portion extends along an edge of the adhesive portion away from the first edge, and
wherein the sheet also comprises
a second adhesive portion that is a portion of the first surface of the sheet to which an adhesive is applied, and that is disposed at a second end portion of the sheet in the first direction, the second end portion being opposite to the first end portion, and
a second fold-back portion disposed on the second end portion of the sheet at a portion apart from the second edge, the second fold-back portion extending along an edge of the second adhesive portion.
18. A laminate sheet, comprising:
an optically transparent first sheet; and
a second sheet laminated on a first surface of the first sheet,
wherein the first sheet includes
a bonded area to which an adhesive is applied and that is disposed at a first end portion on the first surface in a first direction of the first surface,
a fold-back line disposed at the first end portion and extending in a direction crossing the first direction,
a plurality of third perforation lines for separation extending in the first direction parallel to each other,
a fourth perforation line for separation disposed on the first end portion and extending in a direction crossing the first direction, and
a fifth perforation line for separation disposed at a position apart from the first end portion in the first direction, and extending in a direction crossing the first direction.
19. A printing device that transports the laminate sheet according to claim 18 with the first end portion at a front to perform printing on a second surface of the first sheet.

* * * * *